W. GARDINER.
COVER CONSTRUCTION FOR STORAGE BATTERIES.
APPLICATION FILED MAR. 28, 1921.

1,433,542.  
Patented Oct. 31, 1922.

Inventor  
William Gardiner,  
By Bulkley & Durnarton, Atty.

Patented Oct. 31, 1922.

1,433,542

UNITED STATES PATENT OFFICE.

WILLIAM GARDINER, OF CHICAGO, ILLINOIS, ASSIGNOR TO D-G. STORAGE BATTERY COMPANY, OF CHICAGO, ILLINOIS, A CORPORATION OF DELAWARE.

COVER CONSTRUCTION FOR STORAGE BATTERIES.

Application filed March 28, 1921. Serial No. 456,107.

*To all whom it may concern:*

Be it known that I, WILLIAM GARDINER, a citizen of the United States of America, and resident of Chicago, Cook County, Illinois, have invented a certain new and useful Improvement in Cover Constructions for Storage Batteries, of which the following is a specification.

My invention relates to an improvement in cover construction for storage batteries, and has for its object the provision of an improved construction in which the plates and active material are thoroughly protected, and in which the evaporation of the electrolyte is greatly reduced and yet the construction is such as to permit the escape of the gases formed during the operation of the battery.

These and other features and objects of my invention will be more readily understood by having reference to the accompanying drawings, in which I have illustrated one embodiment of my invention.

Figure 1:
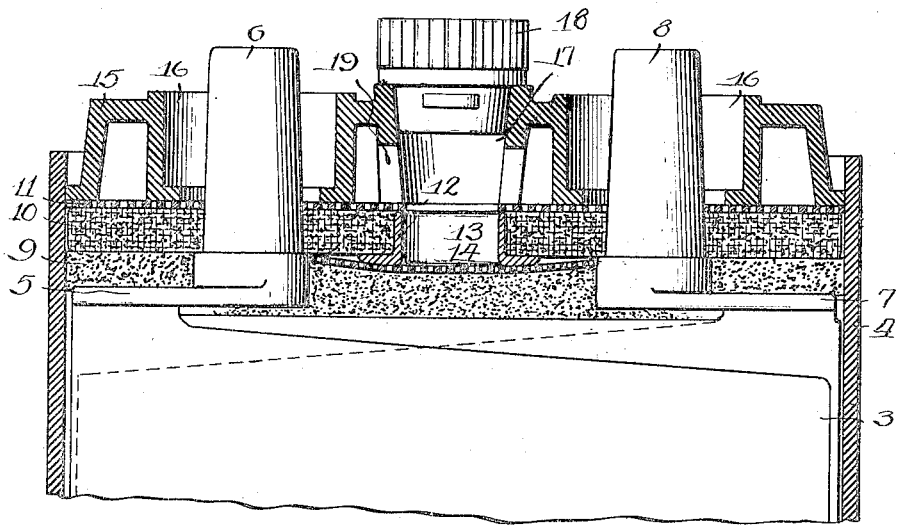
Figure 1 is a sectional view of the upper portion of a battery cell showing the cover construction.
Figure 2:
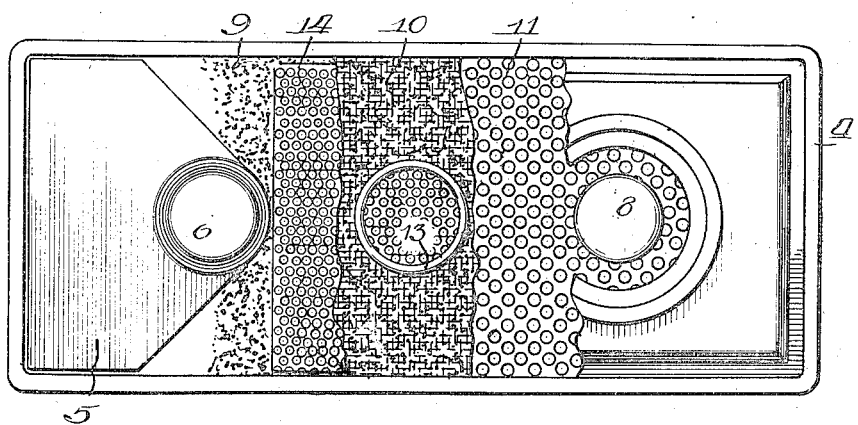
Fig. 2 is a plan view with various sections removed in order to more clearly show the various elements entering into the construction of the cover.

As illustrated, the battery plates 3 are mounted within the containing cell or jar 4, the plates of one polarity being connected together by the connecting strap 5 to which the terminal 6 is secured, while the plates of the opposite polarity are connected together by the connecting strap 7 to which the terminal 8 is secured. Immediately over the top of the plates there is provided a layer of powdered asbestos 9. When the electrolyte is added to the battery this asbestos forms a jelly-like mass but is sufficiently porous so as to permit the escape of gases and also operates to prevent a rapid evaporation of the electrolyte. Above this layer of powdered asbestos there is provided a layer 10 consisting of a sheet of asbestos saturated with glycerine. The upper surface of this asbestos layer 10 is protected by a perforated rubber plate 11, although this plate may be omitted, and in the center of this layer 10 there is a circular collar 12 which surrounds an opening 13, which opening is provided for the purpose of filling and testing the battery. In order to prevent the testing tool from projecting through the layer of powdered asbestos 9, there is provided a perforated rubber plate 14 on top of this powdered asbestos and immediately below the opening 13. On top of the perforated plate 11 there is mounted a hard rubber cover 15 through which the terminals 6 and 8 project and which is provided with suitable recesses 16 surrounding these terminals, into which sealing material is poured after assembly of the battery so as to securely seal the battery. This cover is hollow so as to provide suitable air chambers which aid in preventing undue heating of the battery. A central opening 17 is likewise provided in this cover which is provided with a cap or plug 18, provided with a suitable gas vent (not shown). Suitable passageways 19 are provided between the central opening 17 and the interior of the hollow cover to permit the ready escape of the gases.

With this construction it will be seen that I have devised a very efficient cover construction in which the rapid evaporation of the electrolyte is prevented, and, furthermore, the glycerine with which the layer of asbestos is saturated, has the property of absorbing moisture from the atmosphere, and thus this layer of asbestos remains moist and in this manner the electrolyte is supplied with water so that evaporation of the moisture in the electrolyte is thus further reduced, and it is unnecessary to add water to the battery except at very infrequent intervals.

While I have illustrated and described one particular embodiment of my invention, it will be understood that I do not wish to be limited to the exact construction shown and described, but that various changes and modifications may be made without departing from the spirit and intent of my invention.

What I claim as my invention is:

1. In storage battery construction, a containing jar, a series of plates mounted therein, a cover of insulating material, and a layer of fibrous material saturated with glycerine located between the top of said plates and said cover.

2. In storage battery construction, a containing jar, a series of plates mounted therein, a layer of powdered asbestos, formed over the tops of said plates, a second layer of fibrous material saturated with glycerine mounted on top of said powdered asbestos, and a cover of hard insulating material mounted on top of said layer of fibrous material.

3. In storage battery construction, a containing jar, a series of plates mounted therein, a layer of powdered asbestos formed over the tops of said plates, a second layer of fibrous material saturated with glycerine mounted on top of said powdered asbestos, a cover of hard insulating material mounted on top of said layer of fibrous material, a central opening passing through said cover and layer of fibrous material, and a perforated insulating plate mounted below said opening and on top of said powdered asbestos.

4. In storage battery construction, a containing jar, a series of plates mounted therein, a layer of powdered asbestos formed over said plates, a second layer of fibrous material saturated with glycerine, a perforated sheet of insulating material placed over said fibrous layer, a cover of hard insulating material placed on top of said perforated sheet, and a central opening through said cover and fibrous layer, and a perforated sheet of insulating material mounted beneath said opening and on top of said powdered asbestos.

Signed by me at Chicago, Illinois, this 21st day of March, 1921.

WILLIAM GARDINER.